United States Patent
Koo

(10) Patent No.: US 9,768,979 B2
(45) Date of Patent: Sep. 19, 2017

(54) CAN COMMUNICATION METHOD AND DATA FRAME STRUCTURE FOR IMPROVING COMMUNICATION SPEED THROUGH INCREASE IN DATA AMOUNT

(71) Applicant: Hyundai Motor Company, Seoul (KR)

(72) Inventor: Bon Chang Koo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 107 days.

(21) Appl. No.: 14/692,212

(22) Filed: Apr. 21, 2015

(65) Prior Publication Data

US 2016/0121816 A1     May 5, 2016

(30) Foreign Application Priority Data

Nov. 3, 2014   (KR) .................. 10-2014-0151569

(51) Int. Cl.
*B60R 16/02*      (2006.01)
*H04L 12/40*      (2006.01)
*H04L 29/08*      (2006.01)

(52) U.S. Cl.
CPC .......... *H04L 12/4013* (2013.01); *H04L 67/12* (2013.01); *H04L 2012/40215* (2013.01); *Y02P 90/02* (2015.11)

(58) Field of Classification Search
CPC ....... H04L 67/00; H04L 67/12; H04L 67/125; H04L 12/40; H04L 12/4013; H04L 29/08; H04L 2012/40215; B60R 16/02; B60R 16/023; Y02P 90/02
See application file for complete search history.

(56) References Cited

U.S. PATENT DOCUMENTS

| | | | | |
|---|---|---|---|---|
| 6,172,968 B1 * | 1/2001 | Rasanen | .............. | H04B 7/2659 370/329 |
| 6,708,239 B1 * | 3/2004 | Ellerbrock | ........ | H04L 12/40032 710/62 |
| 9,262,365 B2 * | 2/2016 | Hartwich | .......... | H04L 12/40032 |
| 9,419,737 B2 * | 8/2016 | Fredriksson | .......... | H04J 3/0614 |
| 9,426,164 B2 * | 8/2016 | Otsuka | .................. | H04L 63/123 |
| 9,600,425 B2 * | 3/2017 | Hartwich | ............ | G06F 13/4282 |

(Continued)

FOREIGN PATENT DOCUMENTS

| | | |
|---|---|---|
| JP | 2008-227741 A | 9/2008 |
| KP | 10-2014-0030213 A | 3/2014 |

(Continued)

OTHER PUBLICATIONS

Hartwich, F. et al., "CAN with Flexible Data-Rate", ICC 2012, pp. 14-1-14-9.

*Primary Examiner* — Tri H Phan
(74) *Attorney, Agent, or Firm* — Mintz Levin Cohn Ferris Glovsky and Popeo, P.C.; Peter F. Corless

(57) ABSTRACT

A controller area network (CAN) communication method for electronic devices of a vehicle includes: transmitting data using a data frame in which communication mode information designating high speed CAN communication processing or general CAN communication processing is inserted into a null bit or a reserved bit that is not used in a general CAN communication protocol; receiving the transmitted data; and processing the received data in a high speed CAN communication mode or a general CAN communication mode based on the communication mode information.

8 Claims, 4 Drawing Sheets

(56) References Cited

U.S. PATENT DOCUMENTS

| | | | | |
|---|---|---|---|---|
| 2010/0123924 | A1* | 5/2010 | Kumada | H04L 25/05 358/1.15 |
| 2011/0261801 | A1* | 10/2011 | Powell | H04B 1/707 370/338 |
| 2013/0290580 | A1* | 10/2013 | Hartwich | H04L 12/40032 710/105 |
| 2013/0294460 | A1* | 11/2013 | Hell | H03F 3/24 370/470 |
| 2014/0129900 | A1* | 5/2014 | Hartwich | G06F 13/4282 714/758 |
| 2014/0328357 | A1* | 11/2014 | Fredriksson | H04J 3/0614 370/520 |
| 2014/0337549 | A1* | 11/2014 | Hartwich | H04L 12/4013 710/106 |
| 2016/0080168 | A1* | 3/2016 | Lieder | H04L 12/40032 370/468 |
| 2016/0094312 | A1* | 3/2016 | Fredriksson | H04L 1/0061 714/807 |
| 2016/0254924 | A1* | 9/2016 | Hartwich | H04L 69/10 |
| 2016/0344764 | A1* | 11/2016 | Otsuka | H04L 63/123 |
| 2016/0381679 | A1* | 12/2016 | Ryu | H04W 72/0446 370/329 |

FOREIGN PATENT DOCUMENTS

| | | |
|---|---|---|
| KR | 10-1998-0702616 A | 8/1998 |
| KR | 2002-0058688 A | 7/2002 |
| KR | 10-2014-0001871 A | 1/2014 |
| KR | 10-2014-0030213 A | 3/2014 |
| WO | 96/27960 A1 | 9/1996 |
| WO | 2012-038430 A1 | 3/2012 |

\* cited by examiner

CAN COMMUNICATION METHOD AND DATA FRAME STRUCTURE FOR IMPROVING COMMUNICATION SPEED THROUGH INCREASE IN DATA AMOUNT

CROSS-REFERENCE TO RELATED APPLICATION

This application claims the benefit of and priority to Korean Patent Application No. 10-2014-0151569, filed on Nov. 3, 2014 in the Korean Intellectual Property Office, the disclosure of which is incorporated herein in its entirety by reference.

TECHNICAL FIELD

The present disclosure relates to a controller area network (CAN) communication method in a vehicle, and more particularly, to a CAN communication method in a vehicle and a data frame structure for improving communication speed.

BACKGROUND

As the number of functions and controls implemented in a vehicle has increased, so has the amount of data transmitted and received through controller area network (CAN) communication. Currently, a data field in a data frame through CAN communication is fixed to 8 bytes, and a communication speed is limited to at most 1 Mbps (Mbit/s). Therefore, research has been conducted into improving controller functionality and developing reprogramming software for enhancing communication speed. In addition, protocols for minimizing power consumption of the controller have been variously developed.

However, since there is a limitation in the communication speed, as described above, there is a limitation in enhancing the communication speed through the improvement of controller functionality, the reprogramming, or the like. Additionally, a high cost is required for changing hardware and software in order to apply a Flexray or Ethernet communication protocol having a rapid communication speed to the vehicle.

SUMMARY

The present disclosure has been made to solve the above-mentioned problems occurring in the related art while advantages achieved by the related art are maintained intact.

An aspect of the present disclosure provides a controller area network (CAN) communication method in a vehicle and a data frame structure capable of improving reception stability of data and improving a communication speed. As a result, a traffic load of a CAN bus can be improved by changing a data frame structure for CAN communication in electronic devices of the vehicle, such as a controller, and the like, using the CAN communication in parts of the vehicle, such as the chassis, power train, the vehicle body, multimedia, and the like, in order to increase a data amount.

According to embodiments of the present disclosure, a controller area network (CAN) communication method for electronic devices of a vehicle includes: transmitting data using a data frame in which communication mode information designating high speed CAN communication processing or general CAN communication processing is inserted into a null bit or a reserved bit that is not used in a general CAN communication protocol; receiving the transmitted data; and processing the received data in a high speed CAN communication mode or a general CAN communication mode based on the communication mode information.

The processing of the received data may include processing data of 8 bytes or less carried in a data field of the data frame at a communication speed of 1 Mbps or less when the received data is processed using the general CAN communication mode.

The processing of the received data may include processing data of 8 bytes or less carried in a data field of the data frame at a communication speed of 1 Mbps or less or 2 Mbps or more, depending on communication speed information included in the communication mode information, when a data length is 8 bytes or less and the received data is processed using the high speed CAN communication mode.

The processing of the received data may include processing data of 8 bytes or more carried in a data field of the data frame at a communication speed of 1 Mbps or less or 2 Mbps or more, depending on communication speed information included in the communication mode information, when a data length is 8 bytes or more and the received data is processed using the high speed CAN communication mode.

The data frame may include: a remote transmission request (RTR) bit for designating whether a communication mode is the general CAN communication mode or the high speed CAN communication mode, an extend data length (EDL) bit for designating whether a data length is 8 bytes or less or 8 bytes or more, and a bit rate switch (BRS) bit for designating whether a communication speed is 1 Mbps or less or 2 Mbps or more.

The RTR bit may be allocated to the null bit of the data frame.

The EDL bit and the BRS bit may be allocated to the reserved bit included in a control field of the data frame.

Furthermore, according to embodiments of the present disclosure, a data frame structure for CAN communication for electronic devices of a vehicle includes: an RTR bit for designating whether a communication mode is a general CAN communication mode or a high speed CAN communication mode; an EDL bit for designating whether a data length is 8 bytes or less or 8 bytes or more; and a BRS bit for designating whether a communication speed is 1 Mbps or less or 2 Mbps or more.

The RTR bit may be allocated to a null bit of a data frame that is not used in a general CAN communication protocol, and the EDL bit and the BRS bit may be allocated to a reserved bit included in a control field of a data frame that is not used in a general CAN communication protocol.

Data may be transmitted, received, and processed in the general CAN communication mode or the high speed CAN communication mode using a data frame in which the RTR, EDL, and BRS bits are inserted into a null bit or a reserved bit that is not used in a general CAN communication protocol.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
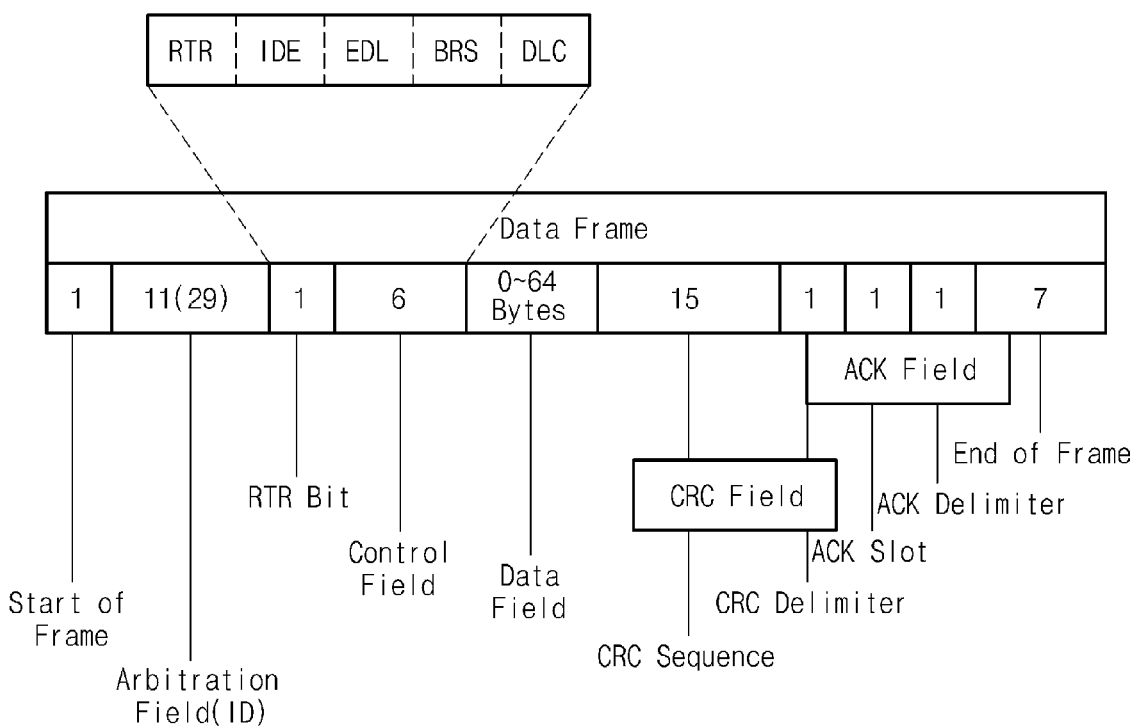
FIG. 1 is a diagram for describing a structure of a data frame for vehicle controller area network (CAN) communication according to embodiments of the present disclosure.

Hereinafter, the present disclosure will be described in detail with reference to the accompanying drawings. Here, throughout the accompanying drawings, the same components will be denoted by the same reference numerals. In addition, a detail description for functions and/or configurations that have been well-known will be omitted. In the following specification, portions required for understanding operations according to embodiments will be mainly described, and a description for components that may obscure the gist of the present disclosure will be omitted. In addition, some components in the accompanying drawings may be exaggerated, omitted, or schematically shown. Sizes of the respective components do not reflect actual sizes of the respective components. Therefore, contents mentioned herein are not limited by relative sizes of or intervals between components shown in the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with other components.

FIG. 1 is a diagram for describing a structure of a data frame for vehicle controller area network (CAN) communication according to embodiments of the present disclosure. Referring to FIG. 1, a data frame for vehicle CAN communication according to embodiments of the present disclosure is similar to a data frame according to a general CAN communication protocol, but includes a partially modified portion. That is, in the present disclosure, a modification is made so as to transmit, receive, and process data in a high speed CAN communication mode or a general CAN communication mode by transmitting and receiving the data using a data frame in which information designating high speed CAN communication or general CAN communication processing is inserted into a null bit or a reserved bit (e.g., RTR, EDL, or BRS bit) that is not used in the data frame according to a general CAN communication protocol, for all electronic devices such as a controller, and the like, of the vehicle using the CAN communication in parts such as the power train, chassis, vehicle body, multimedia, and the like.

As shown in FIG. 1, the data frame for vehicle CAN communication according to embodiments of the present disclosure may be configured to include, for example, a start of frame (SOF) indicating a start of a frame, an arbitration identification (ID) field for inserting an arbitration ID for arbitrating a data priority, a remote transmission request (RTR) bit for requesting transmission of data of a specific ID, a control field for transmitting a control signal, a data field in which data having a predetermined data length are carried, a cyclic redundancy check (CRC) field including a CRC sequence and a CRC delimiter in order to detect an error, an acknowledgement (ACK) field including an ACK slot and an ACK delimiter in order to indicate accuracy of data reception, and an end of frame (EOF). The control field generally includes an identifier extension (IDE) indicating whether a length of the arbitration ID is a standard (11 bits) or an extension (29 bits) and a data length code (DLC) indicating a data length.

The configuration of the data frame for vehicle CAN communication according to embodiments of the present disclosure as described above is similar to that of the data frame according to the general CAN communication protocol. However, particularly, in the present disclosure, the modification is made so as to transmit, receive, and process the data in the high speed CAN communication mode or the general CAN communication mode, if necessary, by inserting meaningful information into the RTR bit, which is a null bit that is not currently used in the general CAN communication, and using a reserved bit included in the control field in the general CAN communication as an extend data length (EDL) bit and a bit rate switch (BRS) bit.

That is, as shown in FIG. 1, the data frame for vehicle CAN communication according to embodiments of the present disclosure includes the RTR bit having mode information (1 bit) for designating whether a communication mode is the general CAN communication mode or the high speed CAN communication mode, the EDL bit having data length information (1 bit) for designating whether a data length is 8 bytes or less or 8 bytes or more to the control field, and the BRS bit having communication speed information (1 bit) for designating whether a communication speed is 1 Mbps or less or 2 Mbps or more.

Figure 2:
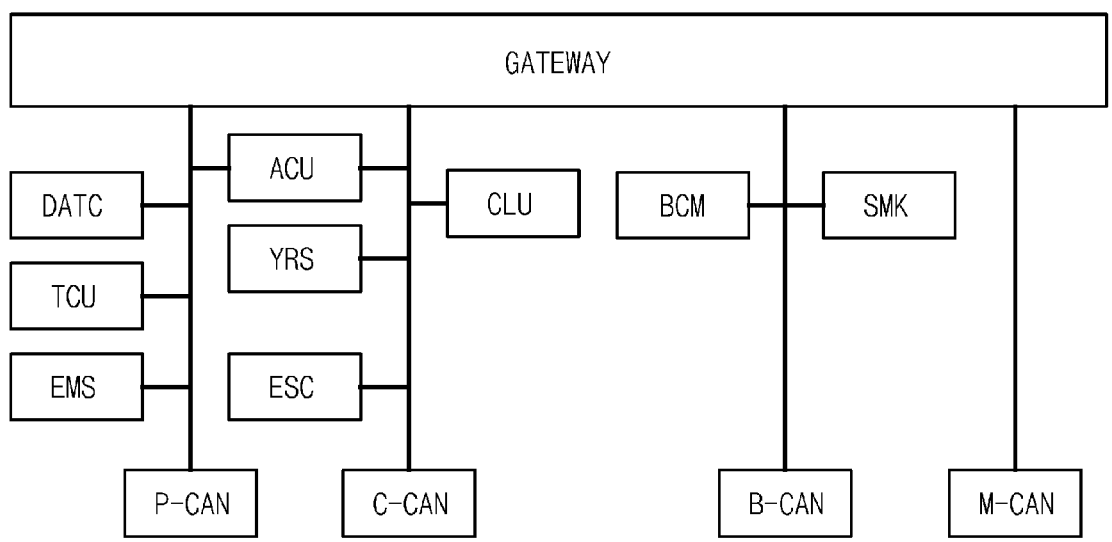
FIG. 2 is a diagram for describing vehicle electronic devices to which vehicle CAN communication according to embodiments of the present disclosure is applied.

FIG. 2 is a diagram for describing vehicle electronic devices to which vehicle CAN communication according to embodiments of the present disclosure is applied. As shown in FIG. 2, the data frame for vehicle CAN communication according to embodiments of the present disclosure is used to transmit and receive the data through a CAN bus in all electronic devices having a large data amount, such as a controller, and the like, performing CAN-communication (P-CAN) of a power train related field and CAN communication (C-CAN) of a chassis related field, such that processing for controlling, sensing, monitoring, and the like, within the vehicle may be performed. However, even though a data amount is not large, the data frame as shown in FIG. 1 is used to transmit and receive the data in all other electronic devices within the vehicle, such as a controller, and the like, performing CAN-communication (B-CAN) of a body related field, CAN communication (M-CAN) of a multimedia related field, and the like, if necessary, such that processing for controlling, sensing, monitoring, and the like, within the vehicle may be performed. In addition, these electronic devices or other components or devices within the vehicle may perform the CAN communication through a gateway connected to the CAN bus.

An example of the electronic devices performing the CAN communication (P-CAN) of the power train related field may include a dual auto temperature control (DATC) module, a transmission control unit (TCU), an engine management system (EMS), and the like, wherein the EMS may include an engine control unit (ECU), various sensors, various actuators, and the like. In addition, an example of the electronic devices performing the CAN communication (C-CAN) of the chassis related field may include a cluster (CLU) module, a yaw rate sensor (YRS), and the like. An airbag control unit (ACU) and an electronic stability control (ESC) module may be common to the power train related field and the chassis related field.

In addition, an example of the electronic devices performing the CAN communication (B-CAN) of the body related field may include a smart key module (SMK), a body control module (BCM), and the like, and an example of the electronic devices performing the CAN communication (M-CAN) of the multimedia related field may include a navigation device or various modules for interworking with other multimedia communication devices within the vehicle.

Figure 3:
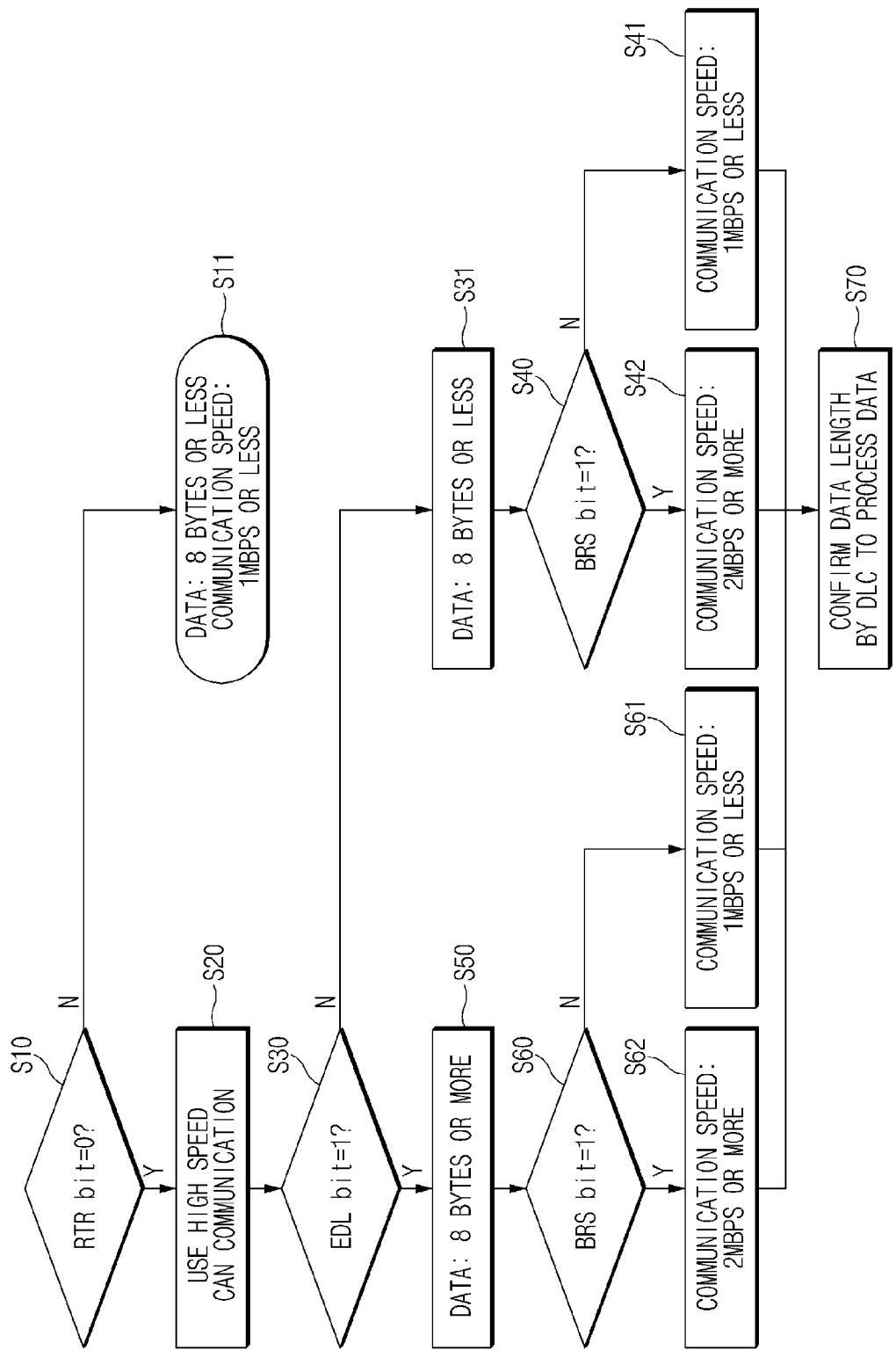
FIG. 3 is a flow chart for describing a CAN communication method in the vehicle electronic devices through the data frame for vehicle CAN communication according to embodiments of the present disclosure.

Hereinafter, a CAN communication method in the vehicle electronic devices through the data frame for vehicle CAN communication according to embodiments of the present disclosure will be described in detail with reference to a flow chart of FIG. 3.

First, the vehicle electronic device may transmit data (or packet(s)) using the data frame in which the information designating the high speed CAN communication or the general CAN communication processing is inserted into the null bit (e.g., RTR) or the reserved bit (e.g., EDL or BRS) that is not used in the general CAN communication protocol as shown in FIG. 1 by a predetermined transmitter. In addition, a target electronic device receiving the data transmitted as described above by the transmitter may analyze the information inserted into the data frame by a predetermined receiver to process a communication mode as the high speed CAN communication mode or the general CAN communication mode (S10 to S70).

First, when the receiver confirms mode information (1 bit) inserted into the RTR bit of the data frame to decide that the communication mode is the general CAN communication mode (RTR bit=1) (S10), it processes data of 8 bytes or less carried in the data field of the data frame at a communication speed of Mbps or less (e.g., 1 Mbps) (S11). In this case, the receiver may process the data with reference to a data length of the corresponding data field with reference to the DLC of the control field. In addition, when the receiver confirms the mode information (1 bit) inserted into the RTR bit of the data frame to decide that the communication mode is the high speed CAN communication mode (RTR bit=0) (S10), it processes the data in the high speed CAN communication mode as follows (S20). Here, the data processing in the general CAN communication mode and the data processing in the high speed CAN communication mode may be performed through only a mode change by the same processor. Alternatively, in the case in which the general CAN communication mode and the high speed CAN communication mode are performed by different processors, an operation of a processor for an operation in the general CAN communication mode may be stopped, and a processor for an operation in the high speed CAN communication mode may be operated.

As described above, after the receiver confirms the mode information (1 bit) inserted into the RTR bit of the data frame to decide that the communication mode is the high speed CAN communication mode (RTR bit=0) (S10), when the receiver confirms the data length information (1 bit) inserted into the EDL bit of the data frame in the high speed CAN communication mode to decide that a data length is 8 bytes or less (EDL bit=0) (S30), it processes the data of the corresponding 8 bytes or less (for example, 8 bytes) (S31), and confirms the communication speed information (1 bit) inserted into the BRS bit of the data frame (S40) to process the data at a communication speed of 1 Mbps or less (e.g., 1 Mbps) (S41) when the BRS bit is 0 and process the data at a communication speed of 2 Mbps or more (for example, 2 Mbps) (S42) when the BRS bit is 1. In this case, the receiver may process the data with reference to the data length of the corresponding data field with reference to the DLC of the control field (S70).

Meanwhile, as described above, after the receiver confirms the mode information (1 bit) inserted into the RTR bit of the data frame to decide that the communication mode is the high speed CAN communication mode (RTR bit=0) (S10), when the receiver confirms the data length information (1 bit) inserted into the EDL bit of the data frame in the high speed CAN communication mode to decide that a data length is 8 bytes or more (EDL bit=1) (S30), it processes the data of the corresponding 8 bytes or more (e.g., 64 bytes) (S50), and confirms the communication speed information (1 bit) inserted into the BRS bit of the data frame (S60) to process the data at a communication speed of 1 Mbps or less (e.g., 1 Mbps) (S61) when the BRS bit is 0 and process the data at a communication speed of 2 Mbps or more (e.g., 2 Mbps) (S62) when the BRS bit is 1. In this case, the receiver may process the data with reference to the data length of the corresponding data field with reference to the DLC of the control field (S70).

Figure 4:
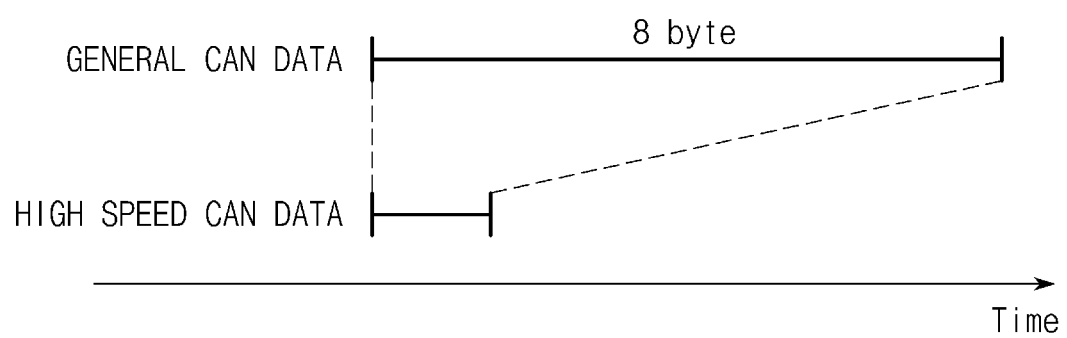
FIG. 4 is a diagram for describing improvement of a communication speed through use of the data frame for vehicle CAN communication according to embodiments of the present disclosure.

Therefore, in the high speed CAN communication mode according to the present disclosure, a data amount may be extended up to 0 to 64 bytes or more, be inserted into the data frame, and be then transmitted and received, and the data may be processed at the communication speed of 2 Mbps or more. For example, even in the case of transmitting and receiving the data of the same 8 bytes, the data may be processed in a time shorter in the high speed CAN communication mode than in the general CAN communication mode, as shown in FIG. 4.

As set forth above, with the CAN communication method in a vehicle and the data frame structure according to embodiments of the present disclosure, the data frame structure having a data amount increased as compared with the related art and improving the CAN communication speed is applied to improve reception stability of the data in all electronic devices in the vehicle, such as the controller, and the like, and improve the communication speed, thereby making it possible to decrease a traffic load of the CAN bus to a half or less. In addition, the CAN communication method in a vehicle according to embodiments of the present disclosure may be applied to all electronic devices of the vehicle, such as the controller, and the like, using the CAN communication in each part of the vehicle such as the power train, chassis, vehicle body, multimedia, and the like.

Hereinabove, although the present disclosure has been described by specific matters such as detailed components, and the like, the embodiments disclosed herein and accompanying drawings have been provided only for assisting in the entire understanding of the present disclosure. Therefore, the present disclosure is not limited to the above-mentioned embodiments, but may be variously modified and altered by those skilled in the art to which the present disclosure pertains without departing from the spirit and scope of the present disclosure. That is, the following claims as well as all contents modified equally or equivalently to the claims are to fall within the scope and spirit of the disclosure.

What is claimed is:

1. A controller area network (CAN) communication method for electronic devices of a vehicle, comprising:
    transmitting data using a data frame in which communication mode information designating high speed CAN communication processing or general CAN communication processing is inserted into a null bit or a reserved bit;
    receiving the transmitted data; and
    processing the received data in a high speed CAN communication mode or a general CAN communication mode based on the communication mode information,
    wherein the data frame includes:
        a remote transmission request (RTR) bit for designating whether a communication mode is the general CAN communication mode or the high speed CAN communication mode, and
        an extend data length (EDL) bit for designating whether a data length is 8 bytes or less or 8 bytes or more.

2. The CAN communication method according to claim 1, wherein the processing of the received data includes processing data of 8 bytes or less carried in a data field of the data frame at a communication speed of 1 Mbps or less when the received data is processed using the general CAN communication mode.

3. The CAN communication method according to claim 1, wherein the processing of the received data includes processing data of 8 bytes or less carried in a data field of the data frame at a communication speed of 1 Mbps or less or 2 Mbps or more, depending on communication speed information included in the communication mode information, when a data length is 8 bytes or less and the received data is processed using the high speed CAN communication mode.

4. The CAN communication method according to claim 1, wherein the processing of the received data includes processing data of 8 bytes or more carried in a data field of the data frame at a communication speed of 1 Mbps or less or 2 Mbps or more, depending on communication speed information included in the communication mode information, when a data length is 8 bytes or more and the received data is processed using the high speed CAN communication mode.

5. The CAN communication method according to claim 1, wherein the data frame further includes:
    a bit rate switch (BRS) bit for designating whether a communication speed is 1 Mbps or less or 2 Mbps or more.

6. The CAN communication method according to claim 5, wherein the RTR bit is allocated to the null bit of the data frame.

7. The CAN communication method according to claim 5, wherein the EDL bit and the BRS bit are allocated to the reserved bit included in a control field of the data frame.

8. The CAN communication method according to claim 1, wherein the data frame further includes one bit for designating whether a communication speed is less than or more than a predetermined number of Mbps.

* * * * *